United States Patent [19]
Grady

[11] Patent Number: 5,120,173
[45] Date of Patent: Jun. 9, 1992

[54] SCREW HEAD WITH SLANT RIB

[75] Inventor: John H. Grady, Wayland, Mass.

[73] Assignee: Phillips Screw Company, Burlington, Mass.

[21] Appl. No.: 736,094

[22] Filed: Jul. 26, 1991

[51] Int. Cl.⁵ .................. F16B 23/00; F16B 35/06
[52] U.S. Cl. .................... 411/404; 411/407; 411/919
[58] Field of Search ............ 411/403, 404, 407, 919; 81/436, 460, 461

[56] References Cited

U.S. PATENT DOCUMENTS

| 4,084,478 | 4/1978 | Simmons | 411/919 |
| 4,202,244 | 5/1980 | Gutshall | 411/404 |
| 5,020,954 | 6/1991 | Dreger | 411/404 |

FOREIGN PATENT DOCUMENTS 2538139 3/1976 Fed. Rep. of Germany ...... 411/404

Primary Examiner—Neill R. Wilson
Attorney, Agent, or Firm—Hayes, Soloway, Hennessey & Hage

[57] ABSTRACT

A screw head is provided with ribs on some of the driver engageable surfaces. The rib is slanted outwardly from the screw axis by a small angle between 1° and 10°.

5 Claims, 2 Drawing Sheets

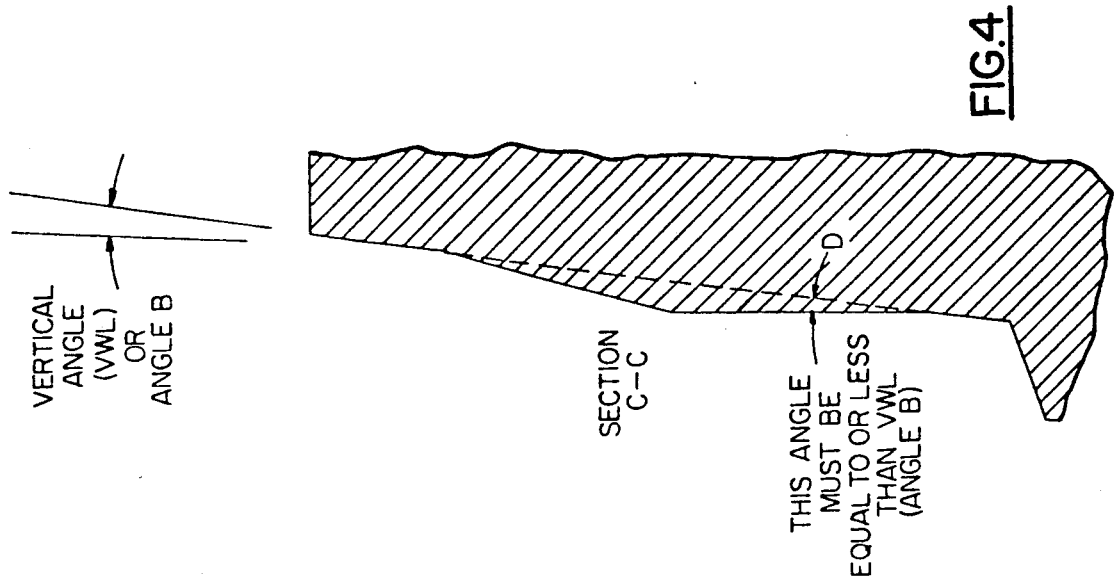
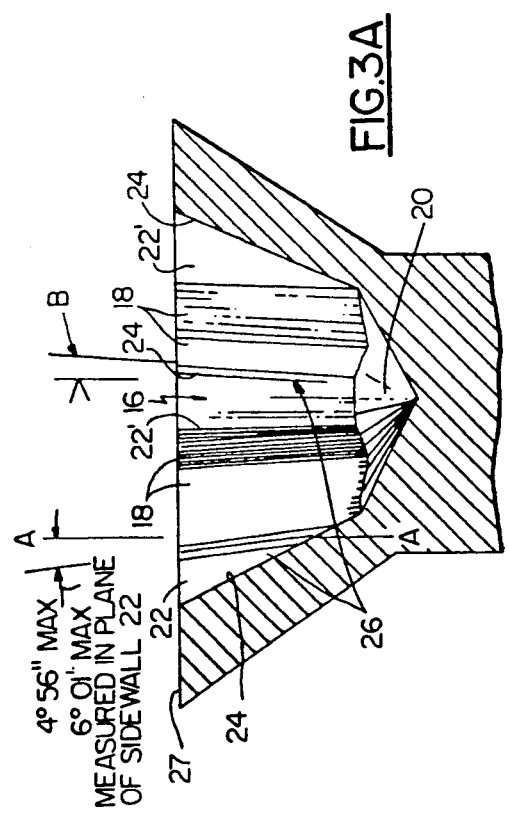
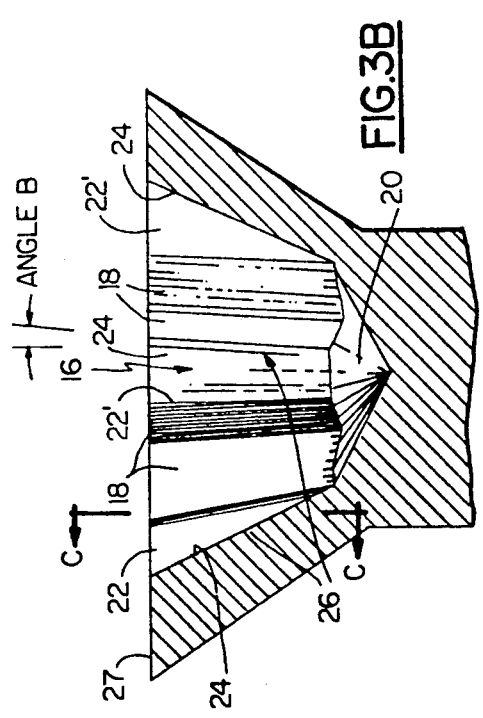

SCREW HEAD WITH SLANT RIB

BACKGROUND OF THE INVENTION

The present invention relates to screw heads of the type described in U.S. Pat. No. 4,084,478 dated Apr. 18, 1978, as generally shown in FIGS. 2 and 3 thereof. Such screw heads are provided with ribs on some of the driver-engageable surfaces of the head to interlock with an edge of the driver to reduce the tendency for the driver to slip out of engagement with the screw head during driving and removal.

In producing such ribs with a metal punch, the metal of the screw head tends to flow outwardly from the screw axis as well as axially, and accordingly, may not completely fill in the rib during the head forming operation.

SUMMARY OF THE INVENTION

In the present invention, this problem of incomplete filling of the rib is improved by slanting the rib outwardly from the screw axis by a small angle between 1° and 10°, preferably about 1° to 6°, to match the angle of flow of the metal. Another requirement of the invention is that the apex angle of the rib, as measured normal to the slant rib angle, is sufficiently large that the rib will not interfere with the withdrawal of the punch from the formed screw head.

DETAILED DESCRIPTION OF THE INVENTION

In order to more fully understand the invention, reference should be had to the following non-limiting detailed description together in connection with the following drawings wherein:

FIGS. 1, 2 and 3 are taken from U.S. Pat. No. 4,084,478.

FIG. 4 is an enlarged sectional view taken along line c—c in FIG. 3b to show angle D which is referred to as the base angle.

Figure 1:
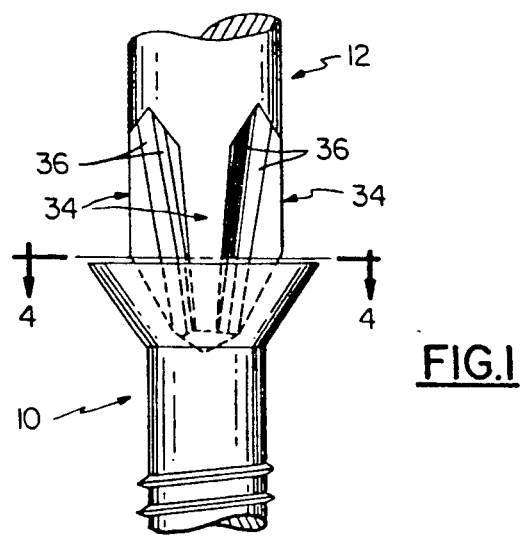
Figure 2:
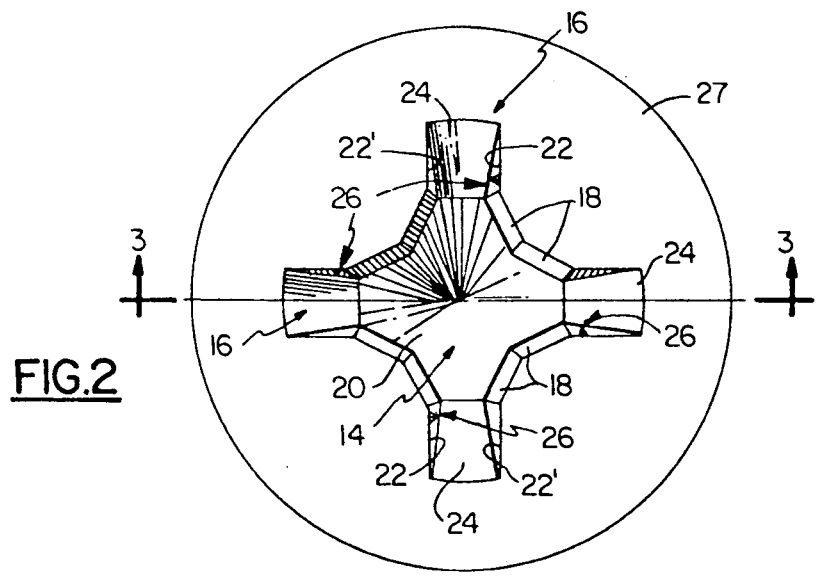

To fully appreciate the present invention, reference should be had to earlier U.S. Pat. No. 4,084,478 of Apr. 18, 1978, which is owned by the assignee of the present application. As mentioned above, FIGS. 1,2 and 3 are directly taken from this '478 patent to avoid unnecessary repetition of the teachings in the '478 patent. All of the disclosure of the '478 patent is pertinent to the present invention.

Figure 3:
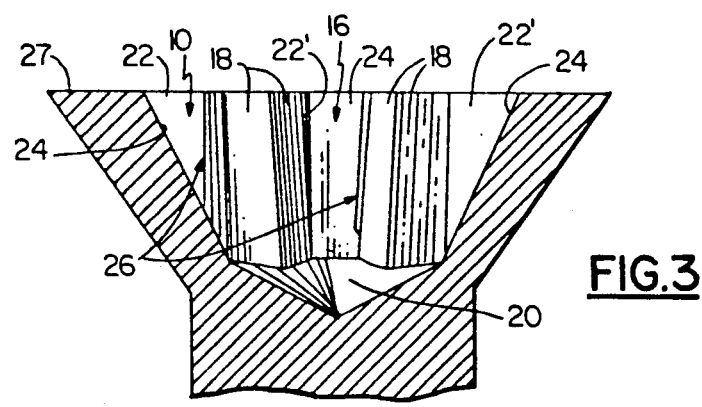
FIG. 3a is a view similar to FIG. 3 showing the slant applied to the rib in accordance with the present invention.
FIG. 3b is like FIG. 3 of '478 showing the wing angle B, which is the angle by which the side wall deviates from the centerline plane of the wing as well as the location of section line c—c.

Referring now to FIG. 3a, this is a view similar to FIG. 3 except it shows the slant angle A by which the apex of the rib deviates from a line parallel to the screw head axis. In FIG. 3a, for purposes of illustration, this angle A has been exaggerated. It must be, in actual practicing, between 1° and 10° preferably about 1° to 6° to match the angle of flow of the metal. The exact angle can readily be determined by appropriate experiments and will be a function of the size of the wing slots, the depth of the screw head, flow characteristics of the metal, temperature of forming, etc.

Since the punch which forms this slant rib must be withdrawn from the formed screw in a direction parallel to the axis of the screw, the formed rib must not interfere with the withdrawal of the punch. To provide this, the rib is provided with an apex angle which is quite large, preferably greater than 90°.

To appreciate this relationship, reference should be had to FIG. 4, wherein the surface of the rib, as seen a section line c—c which is parallel to the axis, will have a base angle D with respect to the vertical wing angle. This base angle D must be less than the vertical wing angle. Thus, any die punch surface which engages the surface of the rib can pass in a vertical direction over this cross section without interference.

For convenience in this specification the angle D is referred to as the base angle and the angle B is referred to as the wing angle. As can be seen by examining FIG. 3b and FIG. 4, if the apex angle is small, a sectional plane parallel to the axis through the rib will show an increased angle D and the punch will not be able to release after the screw head has been formed.

In most commercial screws, the wing angle is on the order of 4° to 5°. With a rib slant angle of 1° to 6°, an apex angle of 90° or more will result in a base angle D of less than the wing angle. If the apex angle is on the order of 70°, and the slant angle is 12°, the base angle will be 16° which is greater than the wing angle. In this case, the punch could not be withdrawn. Thus, it will be clear to one normally skilled in the art that there are several critical points to the invention.

The slant rib angle should be between 1° and 10°, preferably between about 1° to 6°, to match the flow angle of the metal. The apex angle of the rib, as measured normal to the rib, should be sufficiently large, preferably greater than about 95° depending upon the vertical wing angle B of the driver-engageable surface. As the wing angle B becomes larger, the apex angle can become smaller. As the wing angle becomes smaller, then the apex angle must be larger. In any case, the base angle D created by a section through the rib surface and measured to the vertical wing surface must be less than the vertical wing angle.

While one specific embodiment of the invention has been described above, the basic principles can be applied to all of the ribs (including tapered ribs) in the screw head shown in the '478 patent except where the wing angle is 0° (e.g. FIG. 39 of the '478 patent). In this connection, reference should be had to FIG. 38 which apparently shows a slight deviation of the rib 76. However this rib lies within a substantially vertical plane. This rib 76 is not a slant rib as defined in the present invention. The rib edge of the present invention is slanted with respect to the screw axis and accordingly lies in a plane that is not parallel to the screw axis.

I claim:

1. In a screw head provided with a rib on a driver-engageable surface comprising a side wall, the rib having a surface which comes to an apex which is engageable by an edge of the driver to reduce tendency of the driver to slip out of engagement with the side wall, the screw head being formed by a metal-deforming punch to cause metal flow in a predetermined direction;

the improvement wherein the rib is straight and has a triangular cross-section, the apex of the triangle forming a rib edge which is engageable by the edge of the driver, the rib axis being tilted upwardly and outwardly from the screw axis in the direction of metal flow by an angle A (the rib angle) with respect to a plane parallel to the screw axis, said rib angle A being between about 1° and 10°, the associated side wall being slanted outwardly from the screw axis by a small vertical wing angle B between 1° and 10°, said rib having an apex angle sufficiently large that a vertical section through said tilted rib will provide an angle D (the base angle) for the rib surface which is equal to or less than the vertical wing angle B, said apex angle being measured in a plane normal to the rib edge.

2. The screw head of claim 1 wherein said rib angle A is between about 1° and 6°.

3. The screw head of claim 1 wherein said rib angle A is about 3°.

4. The screw head of claim 1 wherein said rib angle A is about 520.

5. The screw head of claim 1 wherein said rib angle A is between about 320 and 6°.

UNITED STATES PATENT AND TRADEMARK OFFICE
CERTIFICATE OF CORRECTION

PATENT NO. : 5,120,173

DATED : June 9, 1992

INVENTOR(S) : John H. Grady

It is certified that error appears in the above-identified patent and that said Letters Patent is hereby corrected as shown below:

"Claim 4, col. 4, line 6, "520" should be --5°--.

"Claim 5, col. 4, line 8, "320" should be --3°--.

Signed and Sealed this

Twentieth Day of September, 1994

BRUCE LEHMAN

*Attest:*

*Attesting Officer*    *Commissioner of Patents and Trademarks*